United States Patent
Yulo

(10) Patent No.: US 8,208,979 B2
(45) Date of Patent: Jun. 26, 2012

(54) SYSTEM AND METHOD FOR HANDLING OPEN AND CLOSE EVENTS IN A MOBILE COMMUNICATION DEVICE

(75) Inventor: Alvin Rey Yulo, Waterloo, CA (US)

(73) Assignee: Research In Motion Limited, Waterloo (CA)

(*) Notice: Subject to any disclaimer, the term of this patent is extended or adjusted under 35 U.S.C. 154(b) by 1149 days.

(21) Appl. No.: 12/041,899

(22) Filed: Mar. 4, 2008

(65) Prior Publication Data
US 2009/0227293 A1  Sep. 10, 2009

(51) Int. Cl.
*H04B 1/38* (2006.01)
(52) U.S. Cl. ............... 455/575.3; 455/575.4; 455/575.1; 455/574; 455/572; 455/566
(58) Field of Classification Search ................. 455/575.1
See application file for complete search history.

(56) References Cited

U.S. PATENT DOCUMENTS

| 4,845,772 | A  | 7/1989 | Metroka et al. |
| 6,367,034 | B1 | 4/2002 | Novik et al. |
| 6,434,371 | B1 | 8/2002 | Claxton |
| 6,434,404 | B1 | 8/2002 | Claxton et al. |
| 6,438,618 | B1 | 8/2002 | Lortz et al. |
| 6,567,672 | B1 | 5/2003 | Park et al. |
| 6,941,557 | B1 | 9/2005 | Jakobson et al. |
| 2007/0099679 | A1 | 5/2007 | Saarisalo |

FOREIGN PATENT DOCUMENTS

| EP | 1406427 |    | 4/2004 |
| EP | 1406427 A2 | * | 4/2004 |

* cited by examiner

*Primary Examiner* — Charles Appiah
*Assistant Examiner* — Randy Peaches
(74) *Attorney, Agent, or Firm* — Ridout & Maybee LLP

(57) ABSTRACT

A method for handling open and close events in a wireless device is provided. The wireless device has a sensor coupled to a processor, the sensor providing an open signal to the processor indicating an open event when the wireless device is opened and providing a close signal to the processor indicating a close event when the wireless device is closed. The method comprises detecting one of the open event and the close event each time the open event or the close event occurs; recording the detected event and a time of the detected event with each event occurrence; monitoring for two recorded events within a predetermined time threshold; executing a first configured action if two events are recorded within the predetermined time threshold; monitoring for only a single recorded event within the predetermined time threshold; and executing a second configured action if only a single event is recorded within the predetermined time threshold.

22 Claims, 7 Drawing Sheets

SYSTEM AND METHOD FOR HANDLING OPEN AND CLOSE EVENTS IN A MOBILE COMMUNICATION DEVICE

TECHNICAL FIELD

The present disclosure relates generally to mobile communication devices, and more particularly to a system and method for handling open and close events for a mobile communication device.

BACKGROUND

Clamshell or flip-style mobile communication devices generally have a base and a hinged or sliding lid that can be closed over the base. Clamshell devices generally provide a user with a primary display inside the lid or on the base that is visible when the device is open. Further, some clamshell devices have a secondary display on the outside of the lid that is visible when the device is closed. Typically, clamshell mobile communication devices perform a function in response to the opening or closing of the hinged lid. For example, most clamshell cellular telephone devices hang-up any telephone call that may be in progress when the device is closed. However, some users like to play with their clamshell telephones by repeatedly opening and closing the device in rapid succession. This can have an undesirable effect, such as inadvertently hanging-up a call in progress that the user did not wish to terminate. Further, the telephone is processing these successive open and close events and attempting to perform functions in response to these events, which needlessly uses up computing resources on the device, such as processing and battery power. It would be desirable to have a mobile communication device that does not waste power and processing resources in this way.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1:
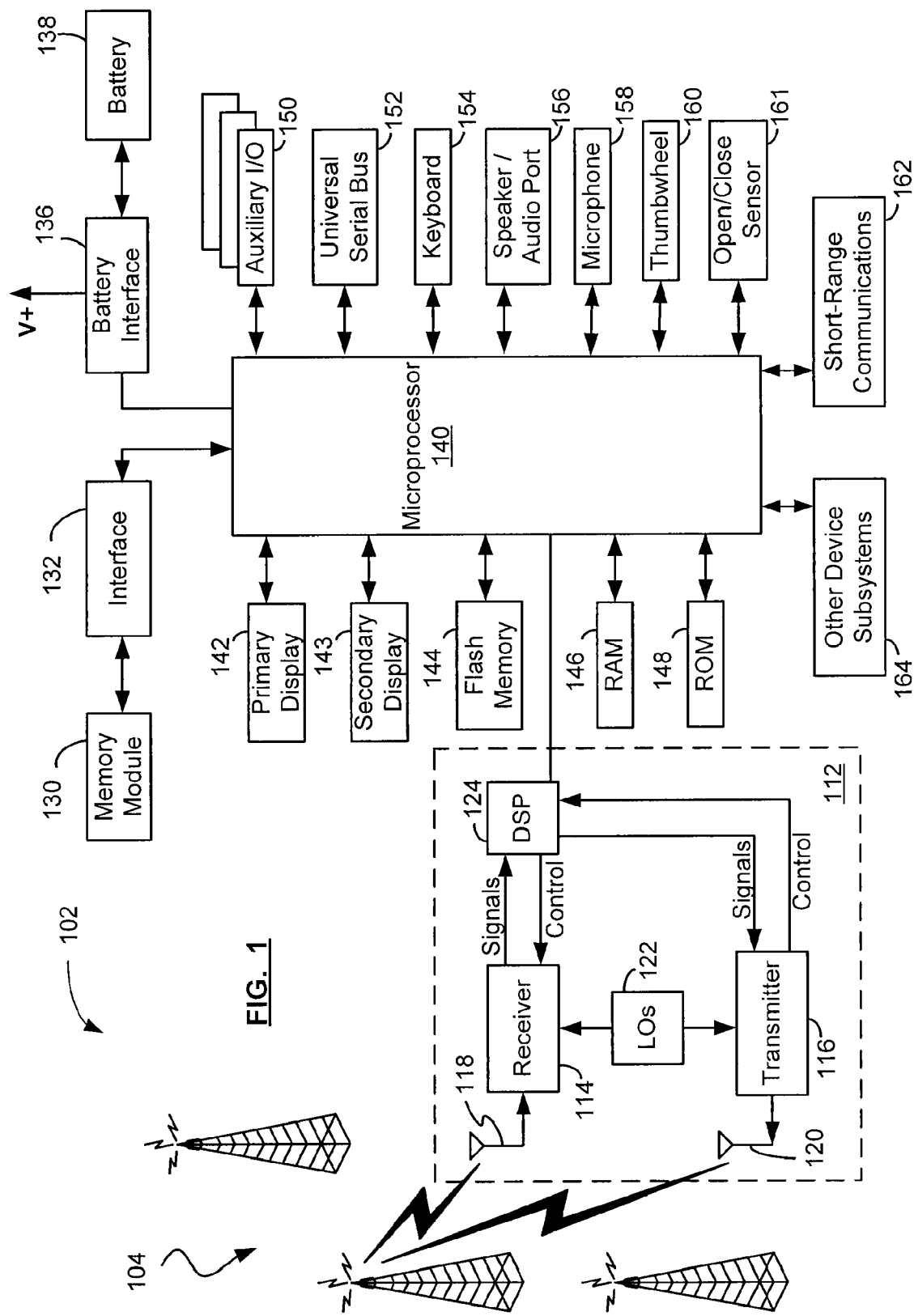
FIG. 1 shows in block diagram form a wireless device suitable for providing notification of events in accordance with an embodiment.

In some aspects there is provided a method for handling open and close events in a wireless device. The wireless device has a sensor connected to a processor. The sensor provides an open signal to the processor indicating an open event when the wireless device is opened and providing a close signal to the processor indicating a close event when the wireless device is closed. The method comprises detecting one of the open event and the close event each time the open event or the close event occurs; recording the detected event and a time of the detected event with each event occurrence; monitoring for two recorded events within a predetermined time threshold; executing a first configured action if the two events are recorded within the predetermined time threshold; monitoring for only a single recorded event within the predetermined time threshold; and executing a second configured action if only the single event is recorded within the predetermined time threshold.

In some aspects there is provided a wireless device having an opened state and a closed state. The wireless device comprises a processor for controlling operation of the wireless device, a sensor providing an open signal to the processor indicating an open event when the wireless device is opened and placed into the opened state and providing a close signal to the processor indicating a close event when the wireless device is closed and placed into the closed state, a first input device coupled to the processor for accepting an input, at least one display device coupled to the processor for communicating an output to the user, a communications subsystem coupled to the processor for communicating with a communications network, a memory coupled to the processor, and a storage device coupled to the processor. The wireless device includes an open/close event handling module resident in the memory for execution by the processor. The open/close event handling module is configured to detect one of the open event and the close event each time the open event or the close event occurs; record in the memory the detected event and a time of the detected event with each event occurrence; monitor for two recorded events within a predetermined time threshold; execute a first configured action if the two events are recorded within the predetermined time threshold; monitor for a only single recorded event within the predetermined time threshold; and execute a second configured action if only the single event is recorded within the predetermined time threshold.

In some aspects there is provided a method for handling open and close events in a wireless device. The wireless device has a sensor coupled to a processor. The sensor provides an open signal to the processor indicating an open event when the wireless device is opened and provides a close signal to the processor indicating a close event when the wireless device is closed. The method comprises detecting one of the close event and the open event each time the open event or the close event occurs; starting a timer if one of the open event and the close event is detected and the timer is not running; resetting and stopping the timer if one of the open event and the close event is detected and the timer is running; and executing a configured action if the timer exceeds a predetermined time threshold.

Reference is first made to FIG. 1, which shows a block diagram illustrating a wireless device 102 suitable for implementing a system and method for handling open and close events in accordance with an embodiment of the present disclosure. It will be understood that references to a wireless device in this disclosure may also refer to a clamshell or flip-style wireless device or to a clamshell or flip-style mobile communication device. The teachings of this disclosure may be applicable to any wireless device having a moveable or removable cover that covers the main display and/or keypad, and is not limited to clamshell devices. Therefore, when the present description and claims refer to a flip-style mobile communication device or flip-style wireless device, the intent is to include any mobile communication device that has a main body portion or lower casing with a moveable or removable cover portion or lid. An example of such a wireless device having a lower casing and lid is discussed below in connection with FIGS. 4A and 4B. The wireless communication device 102 is intended to include, but not be limited to, a wireless device having a lower casing where a lid slides over the lower casing from a first position to a second position, a wireless device having a lower casing where a lid is attached to the lower casing with a hinge mechanism, a wireless device having a lower casing where a lid is rotatably connected to the lower casing, and combinations thereof. For example, some wireless devices have a lower casing with a lid, where the lid slides off of the lower casing to a raised position and the lid is then configured to rotate in this raised position.

The wireless device 102 communicates through a wireless communication network 104. The wireless network 104 includes antennae, base stations, and supporting radio equipment as for supporting wireless communications between the wireless device 102 and other devices connected to wireless network 104. The wireless network 104 may be coupled to a wireless network gateway and to a wide area network, shown in FIG. 2.

In an embodiment, the wireless device 102 is a two-way mobile communication device having at least voice and data communication capabilities, including the capability to communicate with other computer systems. In an embodiment, the wireless device 102 is a clamshell handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), a clamshell device, or a flip-phone. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a primary display 142, an optional secondary display 143, a flash memory 144, a random access memory (RAM) 146, a read-only memory (ROM) 148, auxiliary input/output (I/O) subsystems 150, a data port such as Universal Serial Bus (USB) port 152, a keyboard or keypad 154, a speaker or audio port 156 for connecting to, for example a set of headphones or an earpiece, a microphone 158, a clickable thumbwheel or thumbwheel 160, an open/close sensor 161, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the primary display 142, the secondary display 143, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications have the ability to send and receive data items via either the wireless network 104 or a link to a computer system. The link to the computer system may be via the serial port 152 or the short-range communications subsystem 162. In an embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This may be advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the primary display 142, secondary display 143, or alternatively to the auxiliary I/O device 150. A user of the wireless device 102 may also compose data items, such as email messages, for example, using the keypad 154 and/or the clickable thumbwheel 160 in conjunction with the primary display 142 and possibly the auxiliary I/O device 150. The keypad 154 maybe either a complete alphanumeric keypad or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the primary display 142 or the secondary display 143 may also be used to provide an indication of the identity of a calling party, duration of a voice call, or other voice call related information. Stereo headphones or an earpiece may also be used in place of the speaker 156.

The USB port 152 is normally implemented in a personal digital assistant (PDA) type communication device for which synchronization with a user's computer is a desirable, albeit optional, component. The USB port 152 enables a user to set preferences through an external device or software application and extends the capabilities of the wireless device 102 by providing for information or software downloads to the wireless device 102 other than through the wireless network 104. The alternate download path may, for example, be used to load software or data files onto the wireless device 102 through a direct, reliable and trusted connection.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, and/or 802.11n.

Figure 2:
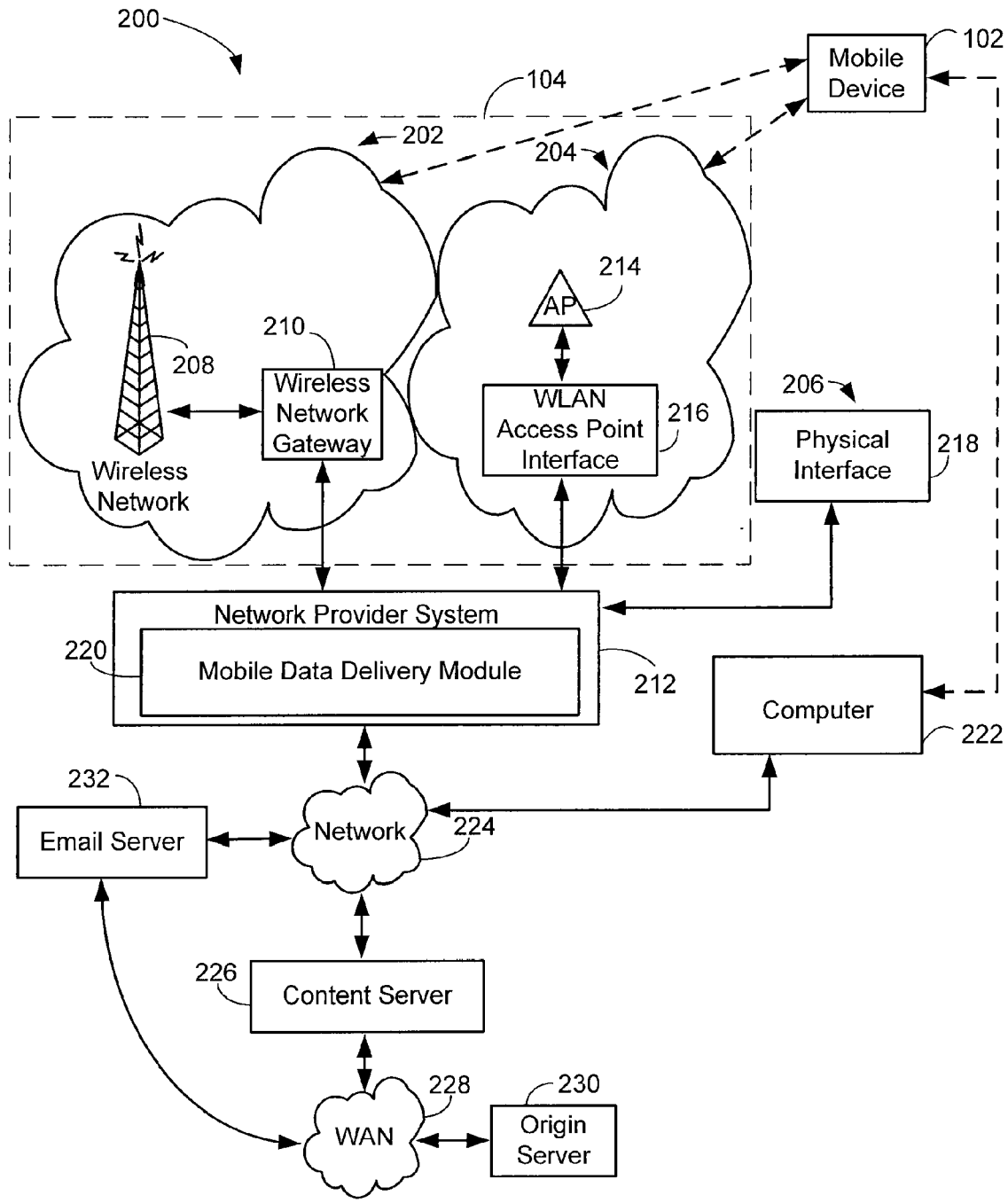
FIG. 2 shows in block diagram form a communication system suitable for providing the operating environment of the wireless device of FIG. 1 in accordance with an embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as one or more of 802.11b, 802.11g, or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to an embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In an embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 can be temporarily and directly connected to the computer 222 using, for example, the USB port 152. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an embodiment, the mobile data delivery module 220 provides connectivity between the wireless WAN 202 and the WLAN 204 and the other connection 206 and devices and/or networks connected directly or indirectly to the network provider system 212. In an embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
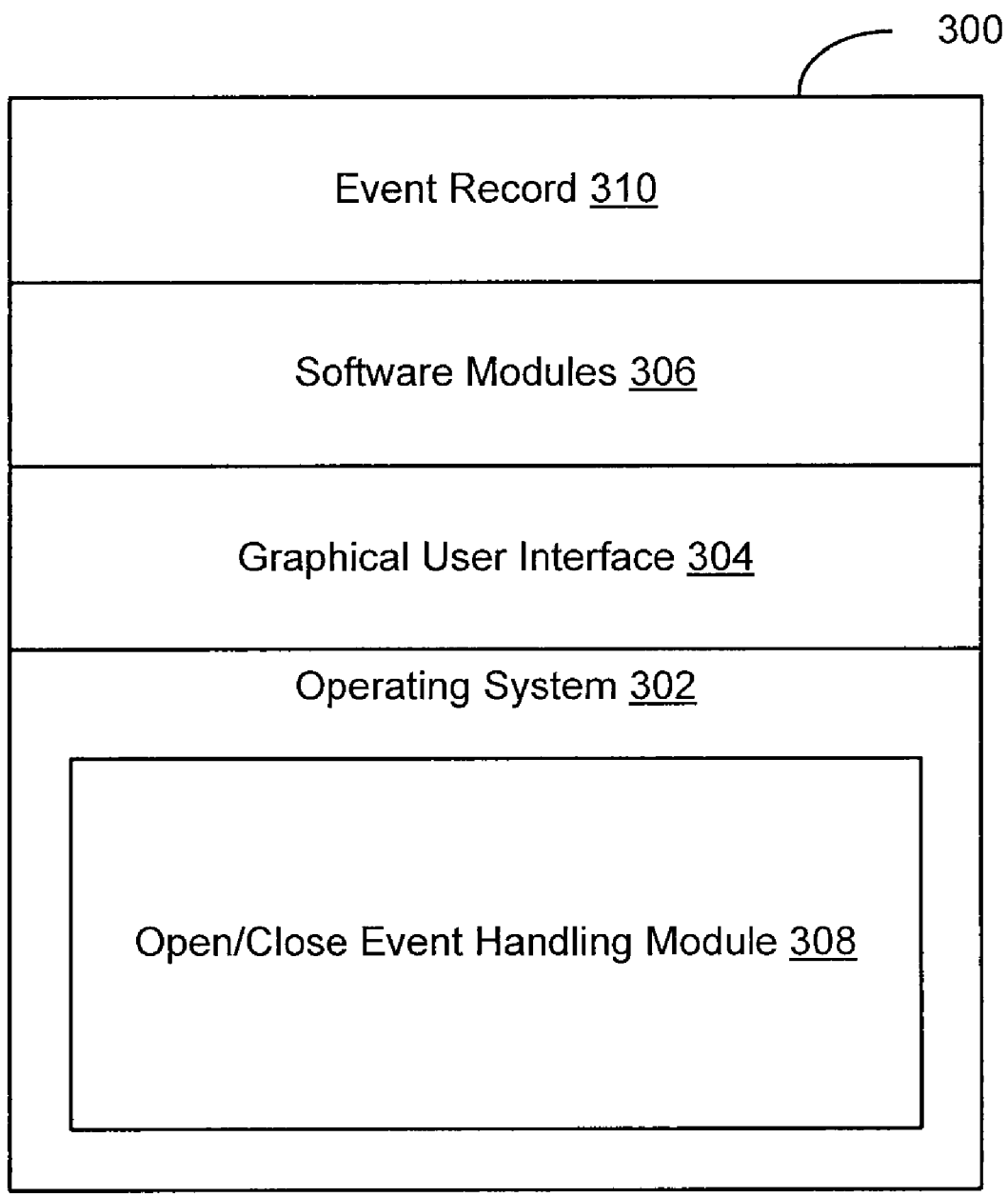
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with an embodiment, the wireless device 102 is intended to be a multi-tasking clamshell mobile communication device for sending and receiving data items, such as instant messages, for making and receiving voice calls, and for creating calendar events and alerts. To provide a user-friendly environment to control the operation of the wireless device 102, an operating system (OS) 302 resident on the wireless device 102 provides a basic set of operations for supporting various applications typically operable through a graphical user interface (GUI) 304, which may include a secondary GUI for display on the optional secondary display 143.

The OS 302 may include an open/close event handling module 308 for generating and/or handling events related to received open and close signals generated by and received from the open/close sensor 161. The open/close sensor 161 may, in one example, be positioned in rotational contact with a hinge on the wireless device 102, or may be positioned near a surface interface where a rotating or sliding cover of the wireless device 102 contacts the main body of the wireless device 102 when the cover is closed. The open/close sensor 161 may supply a signal to an input of the microprocessor 140. For example, the open/close sensor 161 may provide a square wave (i.e., digital "1") signal of any configurable duration each time the sensor 161 detects a transition from an opened state to a closed state or from a closed state to an opened state. Alternatively, the open/close sensor 161 may provide either a digital "1" or "0" signal to the microprocessor 140 input when the wireless device 102 is in one state (e.g., digital "1" when the wireless device 102 is open), and may provide the opposite digital "1" or "0" signal when the wireless device 102 is in the opposite state (e.g., digital "0" when the wireless device 102 is closed). In this case, the microprocessor 140 may perform rising or falling edge detection to detect when the open/close signal supplied by the sensor 161 changes state. The open/close event handling module 308 manages the detection of the signals supplied by the open/close sensor 161 and performs the appropriate functions in response to these signals, which is described in more detail below in connection with FIG. 5. Additionally, the open/close event handling module 308 may provide information related to these open and close events to other software modules, such as the software modules 306, which may execute functions or actions in response to these events.

The operating system 302 provides basic input/output system features to obtain input from the auxiliary I/O 150, the keypad 154, the clickable thumbwheel 160, the open/close sensor 161, and other input devices, and to facilitate output to the user via at least one of the primary display 142 and the secondary display 143. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306. The open/close event handling module 308 may be included among the software modules 306. Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4A:
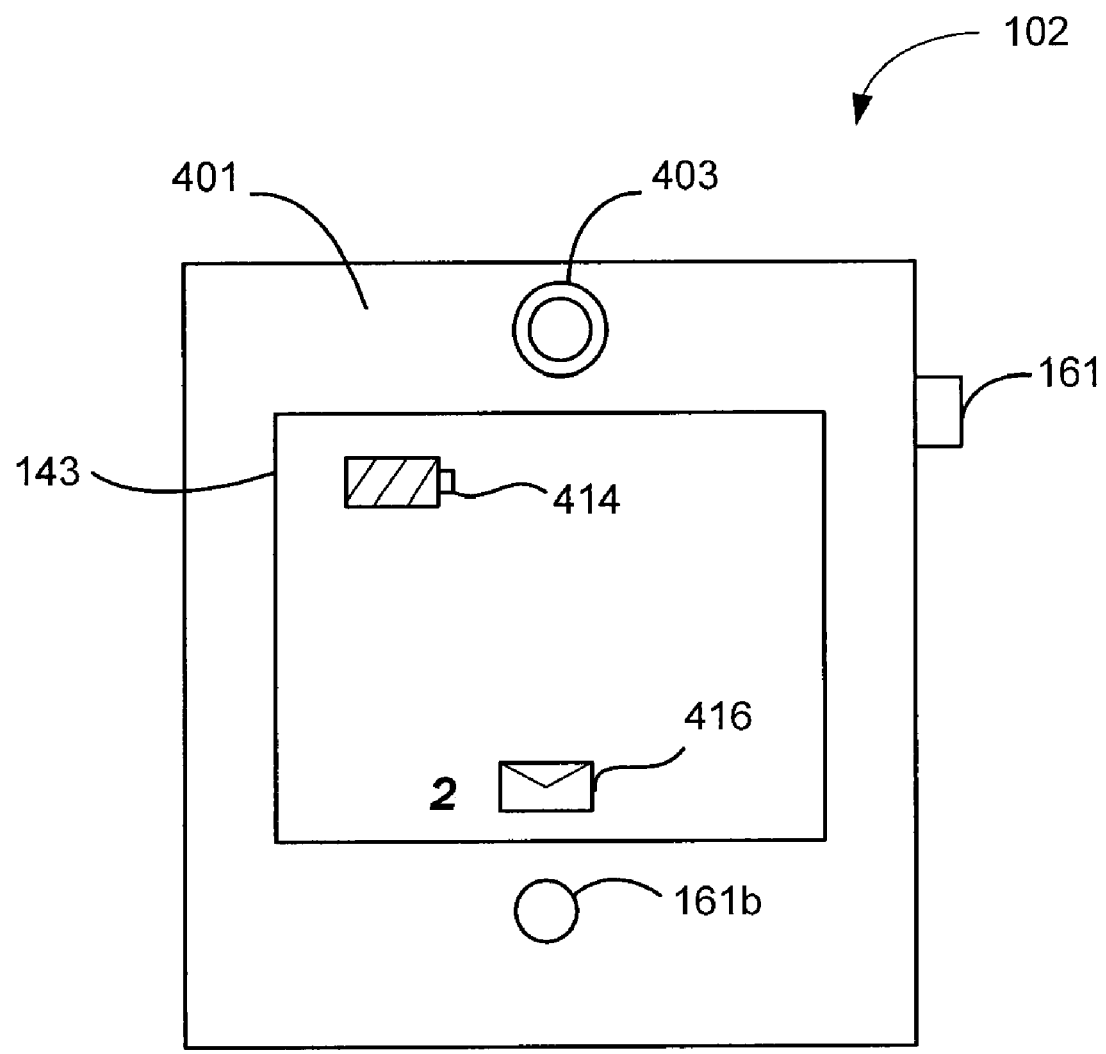
FIG. 4A is a front view illustrating an embodiment of the wireless device of FIG. 1 in a closed configuration.

Reference is next made to FIG. 4A, which shows a front view of an embodiment of a wireless device 102 in a closed configuration. In the shown embodiment, the wireless device 102 is a clamshell mobile communication device. As mentioned above, the wireless device 102 may be a data and/or voice-enabled handheld device. The wireless device 102 includes the primary display 142 that is visible when the wireless device 102 is in an opened configuration (FIG. 4B), and the optional secondary display 143 that is visible when the wireless device 102 is in a closed configuration. The term visible as used above is meant to say that the display may be viewable by the user looking at the front of the wireless device 102; however, the display may or may not be active or displaying the GUI 304 even when the display is not visible to the user. The primary display 142 may be off when the wireless device 102 is in the closed configuration in order to save battery power. Similarly, the secondary display 143 may be off when the wireless device 102 is in the opened configuration in order to save battery power, or the secondary display 143 may show a default image such as a background or a clock when the wireless device 102 is in the opened configuration. The front view of the closed wireless device 102 shows a lid 401, having the optional secondary display 143. The lid 401 may also include secondary navigation tools such as a selection button 161 or a secondary trackball 161b, and a camera lens 403. Although the selection button 161 may be used as a navigation tool for the secondary display 143 when the wireless device 102 is in the closed configuration, the selection button 161 may provide other functions, for example volume or camera control, when the wireless device 102 is in an opened configuration. These other functions for the selection button 161 may be disabled when the wireless device 102 is in the closed configuration, to prevent unintentional activity.

Figure 4B:
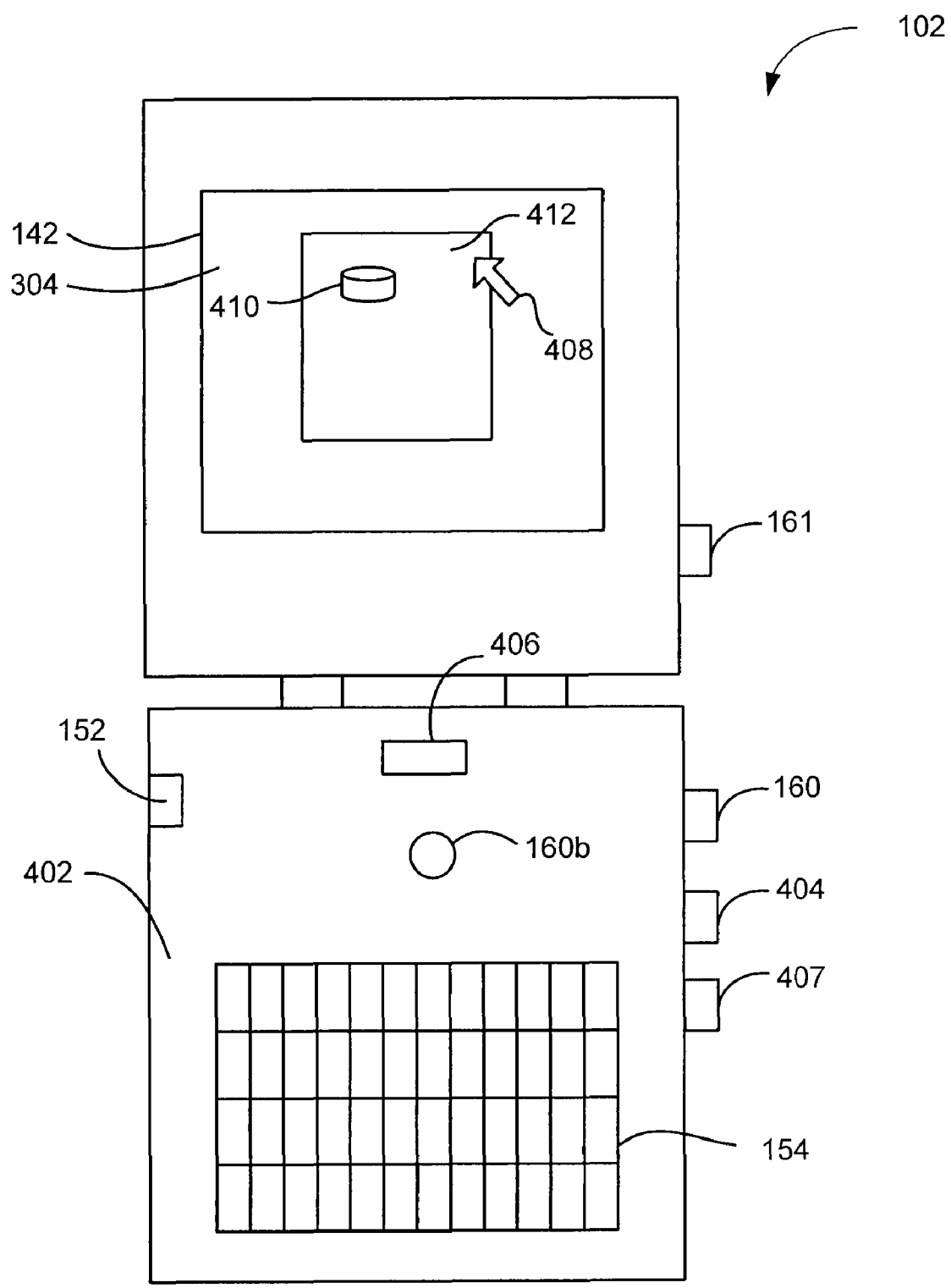
FIG. 4B is a front view illustrating the wireless device of FIG. 4A in an opened configuration.

Reference is next made to FIG. 4B, which shows a front view of the wireless device 102 of FIG. 4A in an opened configuration. The wireless device 102 includes a lower casing 402, the USB port 152, the primary display 142, which displays the GUI 304, the keypad 154, the clickable thumbwheel 160 or other device for navigation such as a trackball 160b, one or more input buttons 404 (e.g., select, cancel, talk buttons), signal inputs/outputs 406 (e.g., power connector input, microphone, speaker, data interface input, etc.), and an audio port 407. Although the wireless device 102 is shown with the primary display 142 being on the inside of the lid 401, the primary display 142 may also be on the lower casing 402 or in any other suitable location. Although the wireless device 102 is shown as having a selection button 161, the clickable thumbwheel 160 may be used instead, and the selection button 161 will be understood to apply equally to the clickable thumbwheel 160. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the primary display 142, the secondary display 143, the clickable thumbwheel 160, etc.

The microprocessor 140 is typically coupled to one or more input devices (e.g., the buttons 404, the keypad 154, the clickable thumbwheel 160, the open/close sensor 161) for receiving user commands, selections or queries, and the primary display 142 and the secondary display 143 for displaying the results of these commands or queries. For example, user queries may be transformed into a combination of commands for producing one or more tables of output data which may be incorporated in one or more display pages for presentation to the user. In another example, user selections may be transformed into a command for displaying a preview of the selection on the primary display 142 or the secondary display 143. The microprocessor 140 is also coupled to the memory 300.

A user may interact with the wireless device 102 and its software modules 306 using the GUI 304. The GUI 304 is controlled by the operating system 302 (FIG. 3) and provides a display format providing information to the user, or enabling the user to choose commands, execute application programs, manage computer files, and perform other functions by selecting pictorial representations (i.e., icons), or selecting items from a menu through the use of an input or pointing device such as the clickable thumbwheel 160 or the keypad 154. Generally, the GUI 304 is used to convey information and receive commands from users and includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user on the primary display 142 and the secondary display 143. The GUI 304 may provide for a full user interface on the primary display 142 and may provide a condensed or simplified user interface on the secondary display 143. For example, the GUI 304 may provide a window 412, which is a display area shown within the primary display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

The GUI 304 may provide for simplified user interaction on the secondary display 143 when the wireless device 102 is closed. For example, the GUI 304 may provide status information, such as a battery status 414, but may not provide for full applications to be displayed. An event notification 416 may also be presented, alerting the user to a new or unacknowledged event, such as an incoming email, an incoming text message, an incoming phone call, an incoming multimedia message (MMS), an incoming instant message (IM), a voice mail notification, a task reminder, an upcoming calendar event, or an alarm event. The user may select an event notification 416 using the selection button 161. Additional information may be presented on the secondary display 143, such as the current time, or other background icons.

Figure 5:
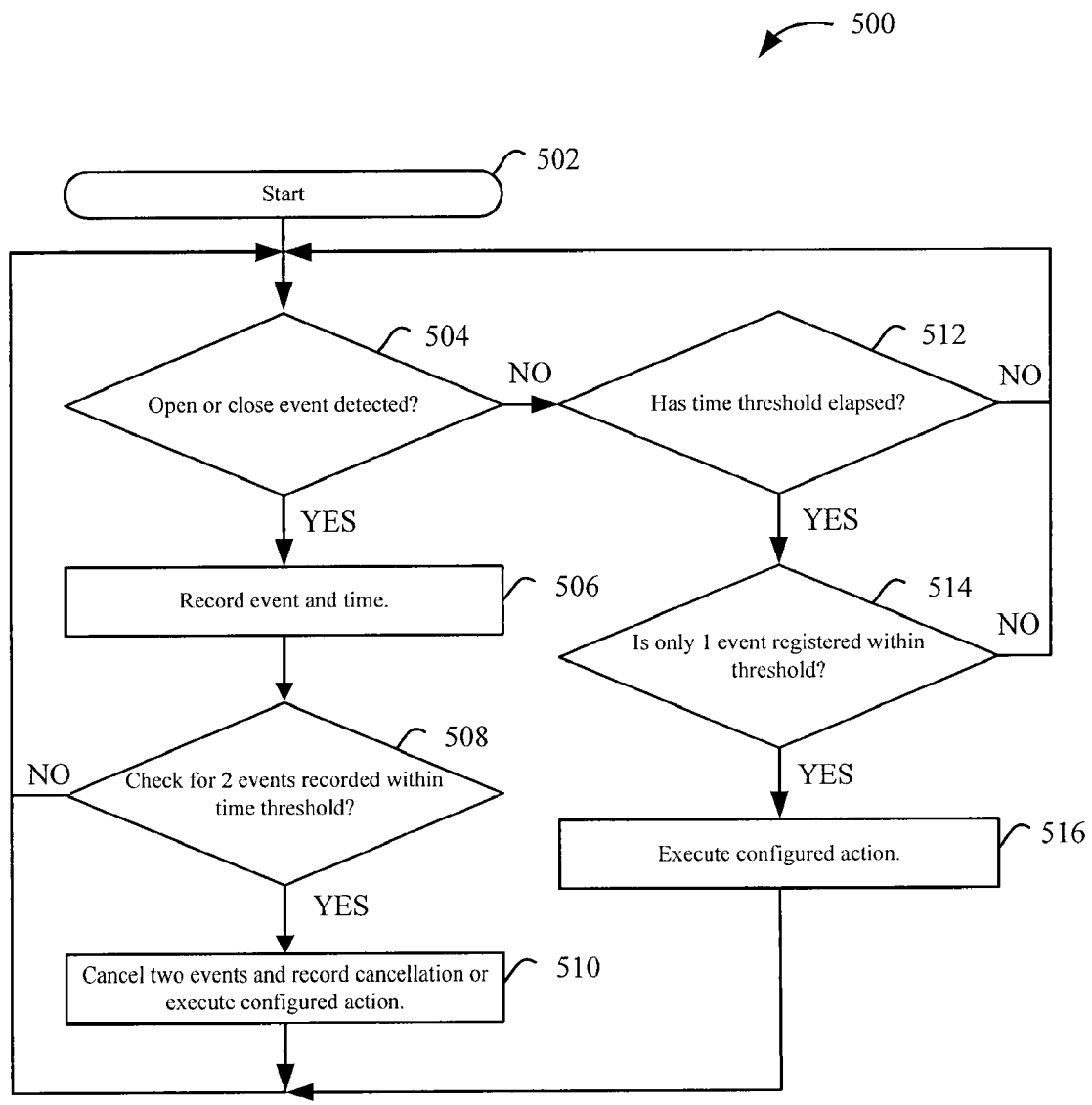
FIG. 5 is a flowchart illustrating a method of handling open and close events in a wireless device in accordance with an embodiment.

Reference is next made to FIG. 5, which shows a method 500 for handling open and close events for a mobile communication device in accordance with one embodiment. The method begins at a starting point 502, for example when the user first powers up the wireless device 102. At this point, the open/close event record 310 (FIG. 3) may be refreshed, meaning that if any data remains saved from when the wireless device 102 was previously powered up, the data is deleted. The method 500 then proceeds to a block 504, where the method 500 awaits an open or close event to occur. For example, the processor 140 (FIG. 1) may execute a listener that runs on the processor 140 and monitors the input port coupled to the open/close sensor 161 and the listener may monitor for rising and/or falling edges of the signal generated by the sensor 161. If an open or close event is detected, the method proceeds to a block 506 where the occurrence of the event and the time of the event are recorded, for example in the event record 310. Next, the method 500 proceeds to a block 508, where the event record is checked to see if two events have been recorded within a predetermined time threshold.

The predetermined time threshold may be set by the user of the wireless device 102 in advance and represents a window of time during which a pair of successive open and close events should be dismissed. For example, a user may desire that if he closes and subsequently opens his wireless device 102 within five hundred milliseconds, any action that would normally be associated with the close event and/or the open event, such as the hanging up of a telephone call in progress, or the suspension of the display 142 to a power saving state and the subsequent re-illumination of the display upon re-opening, is foregone. The time threshold may also have a default preset value, in the event that the user does not set this setting. Alternatively, the time threshold may be hard coded in the wireless device 102 and the user may not configure the time threshold setting. In one example, the default preset value may be fifty or even five milliseconds. Hence, in this example, if two subsequent open and close events were recorded in the event record 310 within five hundred milliseconds, the method 500 proceeds to a block 510 where the two subsequent events are cancelled so that the wireless device 102 will take no action in response to either of these events, and the cancellation is recorded in the event record 310. Alternatively or additionally, the user may have specifically configured the wireless device 102 to perform some specific action in response to the two events occurring within the time threshold, and this action may be executed by the processor 140 at the block 510.

For example, if the wireless device 102 is currently providing the user with a user notification, such as an audible or vibratory alarm indicating that a telephone call is arriving, and if the user opens and subsequently closes the wireless device 102 within five hundred milliseconds, in addition to dismissing the two successive open and close events with respect to any power saving (e.g., awakening) functions, the wireless device 102 may further silence the alarm and immediately send the calling person to the user's voicemail. Further, the block 510 may provide for optional user configurable advanced actions, such as where successive open and close signals are generated by the sensor 161 within a given time frame. For example, if the wireless device 102 is opened and closed three times within five hundred milliseconds, the wireless device 102 may power off. After the block 510 is complete, the method returns to the block 504. If it is determined at the block 508 that two events were not recorded within the time threshold (e.g., either no previous event was recorded before the currently recorded event or the time lapse in between the currently recorded event and the previously recorded event is larger than the time threshold), then the method returns to the block 504.

While the listener is operative at the block 504, the method 500 may also be monitoring for the passing of the time threshold. This may be the same time threshold discussed in connection with the block 508. For example, if only one close or open event was recorded at the block 508 and the time threshold subsequently elapses, the method 500 executes an event or function in response to that one open or close event. As such, if the time threshold has elapsed, as determined by a block 512, the method 500 proceeds to a block 514 where the event record 310 is examined to determine if only a single event had been previously recorded and if the time threshold elapsed after the recording of that event. If this is the case, then a configured action is executed at the block 516. For example, if the user of the wireless device 102 had been on a telephone call and closed the wireless device 102 and left it closed for longer than the time threshold (e.g., for more than five hundred milliseconds), the telephone call may be terminated and the display 142 may be put into power saving mode. In another example, if the user of the wireless device removed the device from his pocket and opened the device and left it open for more than the time threshold (e.g., five hundred milliseconds), the display 142 may be re-illuminated in a full intensity mode so that the user can see the display 142. After the configured action is executed at the block 516, the method 500 returns to the block 504. If it was determined at the block 514 that no open or close event was recently recorded within the time threshold, the method 500 simply returns to the block 504.

Figure 6:
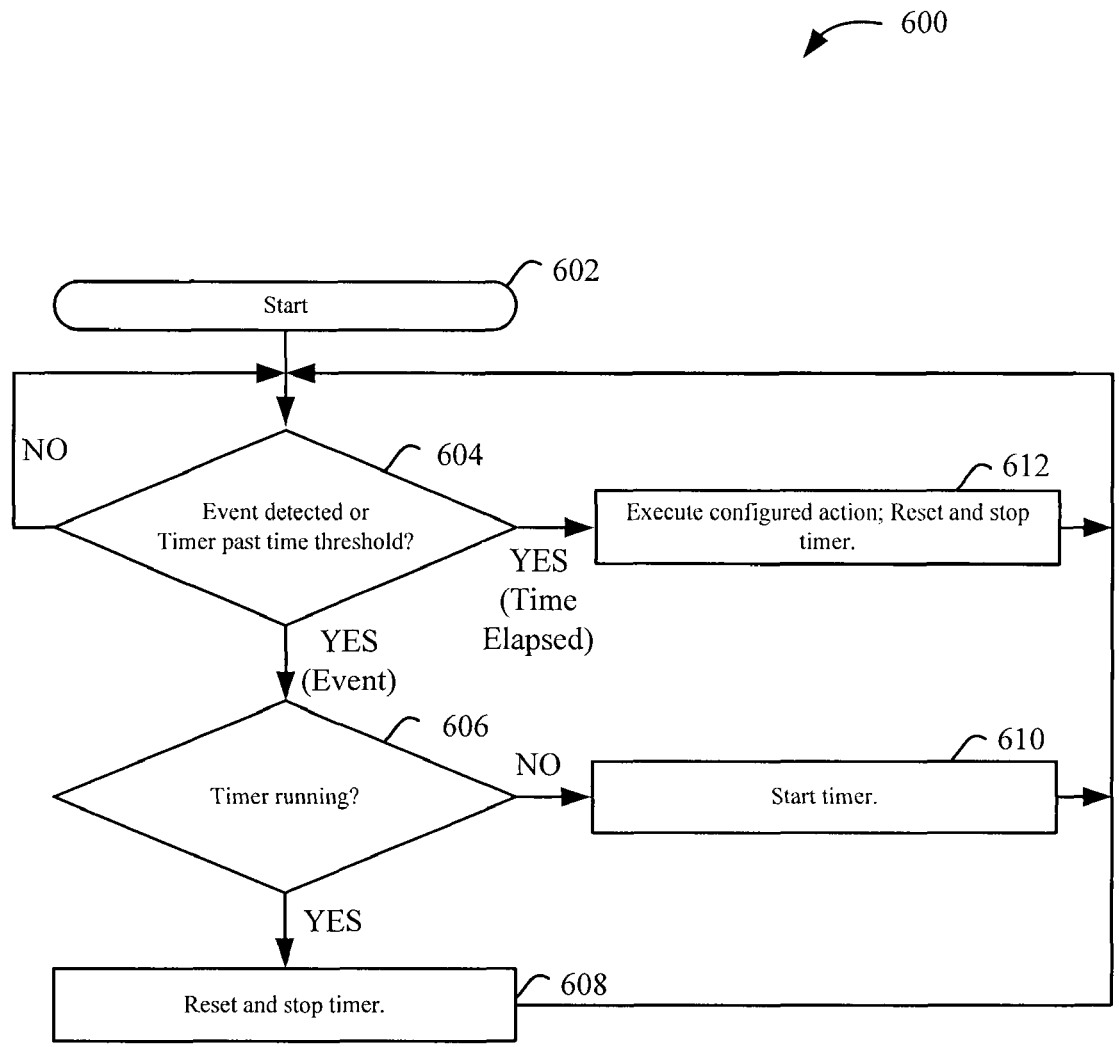
FIG. 6 is a flowchart illustrating a method of handling open and close events in a wireless device in accordance with another embodiment.

Reference is next made to FIG. 6, which shows a simplified method 600 for handling open and close events for a mobile communication device in accordance with another embodiment. The method 600 may be implemented using a timer that waits for a predetermined time threshold to elapse and, in one embodiment, does not use the event record 310. However, the event record 310 may be used in a similar manner as described in connection with FIG. 5, if the user wishes to configure advanced actions (e.g., configure actions for multiple open/close events). The method begins at a starting point 602, for example when the user first powers up the wireless device 102. At this point, the open/close event record 310 (FIG. 3) may be refreshed, if it is used, meaning that if any data remains saved from when the wireless device 102 was previously powered up, the data is deleted. Additionally, the timer may be reset and stopped.

The predetermined time threshold may be set by the user of the wireless device 102 in advance and represents the amount of time during which paired open and close events should be dismissed. For example, a user may desire that if he closes and subsequently opens his wireless device 102 within fifty milliseconds, any action that would normally be associated with the close event and/or the open event, such as the hanging up of a telephone call in progress, or the suspension of the display 142 to a power saving state and the subsequent re-illumination of the display upon opening, is foregone. The time threshold may also have a default preset value, in the event that the user does not set this setting. Alternatively, the time threshold may be hard coded in the wireless device 102 and the user may not configure the time threshold setting. In one example, the default preset value may be five hundred milliseconds. Hence, in this example, if two subsequent open and close events occurred within five hundred milliseconds, the method 600 takes no action in response to this because the successive events merely result in the starting and subsequent stopping and resetting of a timer at blocks 608 and 610, described below.

The method 600 proceeds to a block 604, where the method 600 waits for either an open or close event to occur or the timer threshold to elapse. The timer threshold will only elapse if the timer had been previously started at a block 610, as will be described below. The processor 140 (FIG. 1) may execute a listener that runs on the input port coupled to the open/close sensor 161 and the listener may monitor for rising and/or falling edges of the signal generated by the sensor 161. If an open or close event is detected, the method proceeds to a block 606 to determine if the timer is running. If the timer is running at the block 606, the timer is reset and stopped at the block 608. If the timer is not running at the block 606, the timer is started at the block 610. After completion of either blocks 608 or 610, the method 600 returns to the block 604. If at the block 604, the timer threshold elapses before a further open/close event is detected, a preconfigured action is executed at a block 612. The preconfigured action is related to whether an open or close event was previously detected at the block 604 before the timer was started at the block 610. For example, if the user of the wireless device 102 had been on a telephone call and closed the wireless device 102 and left it closed (e.g., for more than five hundred milliseconds), the telephone call may be terminated and the display 142 may be put into power saving mode. In another example, if the user of the wireless device removed the device from his pocket and opened the device and left it open for more than five hundred milliseconds, the display 142 may be re-illuminated in a full intensity mode so that the user can see the display 142.

Depending on the configuration options chosen by the user of the wireless device 102, the methods 500 and 600 may have a number of results. In one example, the methods 500 and 600 reduce the processing performed by the wireless device 102 because successive open and/or close events that occur within the time threshold do not trigger significant actions that would normally occur, such as the suspending of the wireless device 102 and/or the display 142 to a power saving state and subsequently returning the wireless device 102 and/or the display 142 to a normal, non-power saving state, within a short time period (e.g., within the time threshold). This may also save the user of the wireless device 102 from the consequences of accidentally opening or closing the wireless device 102 if the user reverts his action very quickly. For example, if the user is on a phone call and accidentally or inadvertently closes the phone, the call may not be terminated if the user quickly reopens the wireless device 102. In one example, this serves to filter out unproductive open/close signals generated by the open/close sensor 161, the unproductive signals being two separate successive signals that occur within the specified threshold.

While the blocks of the methods 500 and 600 are shown as occurring in a particular order, it will be appreciated by those skilled in the art that many of the blocks are interchangeable and may occur in different orders than that shown without materially affecting the end results of the methods 500 and 600. Additionally, while open/close event handling is described as principally occurring within the open/close event handling module 308, it will be understood by those skilled in the art that a similar module to the open/close event handling module 308 may be implemented as part of the other software modules on the wireless device, or each software application module may have its own event notification handling sub-module to handle open/close events relating to that application.

While the present disclosure refers to the use of a clickable thumbwheel 160, a trackball 160b, a selection button 161, a secondary trackball 161b, a keyboard 154, an input device, or similar navigation and input mechanisms for navigation on a wireless device 102, it will be appreciated by those skilled in the art that navigation, input or both may be provided by the use of a touchscreen display. The primary display 142, secondary display 143 or both may be a touchscreen display. Navigation or input on a touchscreen display may be by contacting the display directly with fingers, or by using a stylus or a similar pointing device.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for handling open and close events in a wireless device, wherein the wireless device is a flip-style or slide-style wireless device having a lower casing with a lid, wherein one of the lid and lower casing is moveable with respect to the other between an open state and a closed state, the wireless device having a sensor connected to a processor, the sensor providing an open signal to the processor indicating an open event when the wireless device is opened and providing a close signal to the processor indicating a close event when the wireless device is closed, the method comprising:
  detecting one of the open event and the close event each time the open event or the close event occurs;
  recording the detected event and a time of the detected event with each event occurrence;
    monitoring for two recorded events within a predetermined time threshold;
    executing a first configured action if the two events are recorded within the predetermined time threshold;

monitoring for only a single recorded event within the predetermined time threshold; and executing a second configured action if only the single recorded event is recorded within the predetermined time threshold, wherein the second configured action includes placing a display of the wireless device into a power saving mode in response to the single recorded event being the close event.

2. The method according to claim 1, wherein the wireless device is a flip-style wireless device selected from the group consisting of a wireless device having a lower casing with a moveable lid, a wireless device having a lower casing and a lid where the lid slides over the lower casing from a first position to a second position, a wireless device having a lower casing and a lid where the lid is attached to the lower casing with a hinge mechanism, a wireless device having a lower casing and a lid where the lid is rotatably connected to the lower casing, and a wireless device having a lower casing and a lid, where the lid slides off of the lower casing from a first position to a second position with the lid being configured to rotate in the second position.

3. The method according to claim 1, wherein the first configured action includes taking no action in response to the two recorded events occurring within the predetermined time threshold.

4. The method according to claim 3, further including canceling the recording of the two recorded events by performing an action selected from the group consisting of deleting the recordings of the two events and further recording the two events as cancelled.

5. The method according to claim 1, wherein the predetermined time threshold is five milliseconds or less.

6. The method according to claim 1, wherein the predetermined time threshold is five hundred milliseconds or less.

7. The method according to claim 1, wherein the second configured action includes an action associated with the single recorded event.

8. The method according to claim 1, wherein the second configured action includes bringing a display of the wireless device out of a power saving mode in response to the single recorded event being the open event.

9. The method according to claim 1, wherein software running on the wireless device receives the recording of the two events and performs an action in response to the two recorded events, the action including the disabling of user notifications.

10. A wireless device having a lower casing with a lid, wherein the wireless device is a flip-style or slide-style wireless device in which one of the lid and lower casing is moveable with respect to the other between an opened state and a closed state, the wireless device comprising:

a processor for controlling operation of the wireless device;
a sensor providing an open signal to the processor indicating an open event when the wireless device is opened and placed into the opened state and providing a close signal to the processor indicating a close event when the wireless device is closed and placed into the closed state;
a first input device coupled to the processor for accepting an input; at least one display device coupled to the processor for communicating an output to the user;
a communications subsystem coupled to the processor for communicating with a communications network;
a memory coupled to the processor; and
a storage device coupled to the processor;

the wireless device including an open/close event handling module resident in the memory for execution by the processor, the open/close event handling module being configured to:

detect one of the open event and the close event each time the open event or the close event occurs;
record in the memory the detected event and a time of the detected event with each event occurrence;
monitor for two recorded events within a predetermined time threshold;
execute a first configured action if the two events are recorded within the predetermined time threshold;
monitor for only a single recorded event within the predetermined time threshold; and
execute a second configured action if only the single event is recorded within the predetermined time threshold, wherein the second configured action includes placing the display device of the wireless device into a power saving mode in response to the single recorded event being the close event.

11. The wireless device according to claim 10, wherein the wireless device is a flip-style wireless device selected from the group consisting of a wireless device having a lower casing with a moveable lid, a wireless device having a lower casing and a lid where the lid slides over the lower casing from a first position to a second position, a wireless device having a lower casing and a lid where the lid is attached to the lower casing with a hinge mechanism, a wireless device having a lower casing and a lid where the lid is rotatably connected to the lower casing, and a wireless device having a lower casing and a lid, where the lid slides off of the lower casing from a first position to a second position with the lid being configured to rotate in the second position.

12. The wireless device according to claim 10, wherein the first configured action includes taking no action in response to the two recorded events occurring within the predetermined time threshold.

13. The wireless device according to claim 12, further including canceling the recording of the two events by performing an action selected from the group consisting of deleting the recordings of the two events and further recording the two events as cancelled.

14. The wireless device according to claim 10, wherein the predetermined time threshold is five milliseconds or less.

15. The wireless device according to claim 10, wherein the predetermined time threshold is five hundred milliseconds or less.

16. The wireless device according to claim 10, wherein the second configured action includes an action associated with the single recorded event.

17. The wireless device according to claim 10, wherein the second configured action includes bringing the display device of the wireless device out of a power saving mode in response to the single recorded event being the open event.

18. The wireless device according to claim 10, wherein software running on the wireless device receives the recording of the two events and performs an action in response to the two recorded events, the action including disabling of user notifications.

19. A method for handling open and close events in a wireless device, the wireless device having a sensor coupled to a processor, the sensor providing an open signal to the processor indicating an open event when the wireless device is opened and providing a close signal to the processor indicating a close event when the wireless device is closed, the method comprising:

detecting one of the close event and the open event each time the open event or the close event occurs;

starting a timer if one of the open event and the close event is detected and the timer is not running;

resetting and stopping the timer if one of the open event and the close event is detected and the timer is running; and executing a configured action if the timer exceeds a predetermined time threshold, wherein the configured action includes placing a display of the wireless device into a power saving mode when the last detected event is the close event and bringing a display of the wireless device out of a power saving mode when the last detected event is the open event.

20. A method for handling open and close events in a wireless device, wherein the wireless device is a flip-style or slide-style wireless device having a lower casing with a lid, wherein one of the lid and lower casing is moveable with respect to the other between an open state and a closed state, the wireless device having a sensor coupled to a processor, the sensor providing an open signal to the processor indicating an open event when the wireless device is opened and providing a close signal to the processor indicating a close event when the wireless device is closed, the method comprising:

detecting one of the close event and the open event each time the open event or the close event occurs;

starting a timer if one of the open event and the close event is detected and the timer is not running;

resetting and stopping the timer if one of the open event and the close event is detected and the timer is running; and executing a configured action if the timer exceeds a predetermined time threshold, wherein the configured action includes placing a display of the wireless device into a power saving mode when the last detected event is the close event and bringing a display of the wireless device out of a power saving mode when the last detected event is the open event.

21. The method according to claim 19, wherein the predetermined time threshold is selected from the group consisting of five milliseconds or less and five hundred milliseconds or less.

22. The method according to claim 19, wherein the configured action includes an action associated with the last detected event.

* * * * *